(12) United States Patent
Kwag et al.

(10) Patent No.: US 9,328,176 B2
(45) Date of Patent: May 3, 2016

(54) FUNCTIONAL STYRENE-BUTADIENE COPOLYMER

(75) Inventors: Gwanghoon Kwag, Daejeon (KR); Hoo Chae Kim, Daejeon (KR); Donghyuk Na, Daejeon (KR); Hyun-jong Paik, Busan (KR); Jongyeop Lee, Busan (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 186 days.

(21) Appl. No.: 12/732,666

(22) Filed: Mar. 26, 2010

(65) Prior Publication Data

US 2011/0098404 A1 Apr. 28, 2011

(30) Foreign Application Priority Data

Oct. 22, 2009 (KR) .................. 10-2009-0100866

(51) Int. Cl.
| | | |
|---|---|---|
| C08F 220/32 | (2006.01) | |
| C08C 19/40 | (2006.01) | |
| B60C 1/00 | (2006.01) | |
| C08K 3/36 | (2006.01) | |
| C08L 9/06 | (2006.01) | |
| C08L 15/00 | (2006.01) | |
| C08L 19/00 | (2006.01) | |
| C08F 236/10 | (2006.01) | |
| C08F 212/08 | (2006.01) | |
| C08F 236/06 | (2006.01) | |
| C08K 5/548 | (2006.01) | |
| C08L 9/00 | (2006.01) | |

(52) U.S. Cl.
CPC . *C08C 19/40* (2013.01); *B60C 1/00* (2013.01); *C08K 3/36* (2013.01); *C08L 9/06* (2013.01); *C08L 15/00* (2013.01); *C08L 19/006* (2013.01); *C08F 212/08* (2013.01); *C08F 220/32* (2013.01); *C08F 236/06* (2013.01); *C08F 236/10* (2013.01); *C08F 2220/325* (2013.01); *C08F 2810/50* (2013.01); *C08K 5/548* (2013.01); *C08L 9/00* (2013.01)

(58) Field of Classification Search
CPC ......... B60C 1/00; C08C 19/40; C08F 212/08; C08F 236/06; C08F 236/10; C08F 220/32; C08F 2220/325; C08F 2810/50
USPC .......................... 528/392, 396, 421; 524/575
See application file for complete search history.

(56) References Cited

U.S. PATENT DOCUMENTS

| | | | | |
|---|---|---|---|---|
| 3,431,246 | A | * | 3/1969 | Bernardino .................. 526/225 |
| 3,563,946 | A | | 2/1971 | Miller |
| 3,575,913 | A | | 4/1971 | Meier |
| 4,064,081 | A | | 12/1977 | McCoy et al. |
| 4,609,617 | A | * | 9/1986 | Yamazaki et al. ............ 430/535 |
| 5,274,027 | A | | 12/1993 | Guillaume et al. |
| 5,302,655 | A | | 4/1994 | Guillaume et al. |
| 6,512,053 | B1 | | 1/2003 | Colvin et al. |
| 6,716,925 | B2 | | 4/2004 | Thielen et al. |
| 2002/0120052 | A1 | * | 8/2002 | Wendling .............. C08F 236/12 524/495 |

FOREIGN PATENT DOCUMENTS

GB 1003935 A * 9/1965 .............. C08F 16/12

OTHER PUBLICATIONS

Simms; "Epoxide-substituted vinyl and acrylate copolymers"; Journal of Applied Polymer Science; 5(13), 58-63; 1961.*

* cited by examiner

*Primary Examiner* — Richard A Huhn
(74) *Attorney, Agent, or Firm* — Hauptman Ham, LLP

(57) ABSTRACT

A functional styrene-butadiene copolymer is disclosed. More specifically, the copolymer is prepared by radical polymerization of a styrene monomer, a butadiene monomer and an epoxy acrylate monomer in an emulsion state and ring-opening of the resultant styrene-butadiene-epoxy acrylate copolymer. When blended with silica, the disclosed copolymer provides excellent wet stopping performance and superior wear resistance. Therefore, it can be usefully applied for industrial materials including fuel-efficient tires, snow tires, belts, hoses, etc.

3 Claims, 9 Drawing Sheets

FUNCTIONAL STYRENE-BUTADIENE COPOLYMER

CROSS-REFERENCE(S) TO RELATED APPLICATIONS

This application claims under 35 U.S.C. §119(a) the benefit of Korean Patent Application No. 10-2009-0100866 filed Oct. 22, 2009, the entire contents of which are incorporated herein by reference.

BACKGROUND OF THE INVENTION

1. Field of the Invention

The present invention relates to a functional styrene-butadiene copolymer.

2. Description of Related Art

In general, styrene-butadiene copolymers or styrene-butadiene-polar monomer copolymers are mainly prepared by emulsion copolymerization. These copolymers are used for tires, coating materials, toners, etc. Methods for preparing styrene-butadiene copolymers or styrene-butadiene-polar monomer copolymer by the emulsion copolymerization technique have been disclosed in many patents. For example, U.S. Pat. Nos. 3,575,913 and 3,563,946 disclose preparation of styrene-butadiene or styrene-butadiene-acrylate copolymer in emulsion state using potassium persulfate or azobisisobutyronitrile. U.S. Pat. No. 4,064,081 describes emulsion polymerization of butadiene-styrene copolymer, wherein potassium persulfate is used as a polymerization initiator. U.S. Pat. Nos. 5,274,027 and 5,302,655 describe emulsion polymerization of styrene-butadiene-acrylate copolymer using itaconic acid, methyl methacrylic acid, etc. as an acrylate compound and using ammonium persulfate, etc. as an initiator.

And, U.S. Pat. Nos. 6,512,053 and 6,716,925 describe emulsion polymerization of styrene-butadiene-acrylate copolymer using a hydroxy alkyl acrylate such as 2-hydroxyethyl(meth)acrylate, 2-hydroxypropyl(meth)acrylate, hydroxymethyl(meth)acrylamide, etc., as an acrylate compound and using ammonium persulfate, etc., as an initiator.

These styrene-butadiene copolymers prepared by emulsion polymerization have poor silica compatibility. To improve the silica compatibility, introduction of a carboxylic acid such as acrylic acid is required. However, vinyl carboxylic acid monomers react slowly and change acidity thereby interrupting micelle formation. In addition, removal of residual monomer is restricted. The monomer content needs to be increased to improve the silica compatibility. However, this leads to difficulty in processing the blend, and, as a result, the product has very high viscosity and hardness.

In the tire industries, demands on new styrene-butadiene rubber having polar groups and silica composite adequate for manufacturing silica tires are increasing.

SUMMARY OF THE INVENTION

The inventors of the present invention have carried out researches to solve the silica compatibility problem of the styrene-butadiene copolymer prepared by emulsion polymerization. As a result, they have developed a functional styrene-butadiene copolymer with improved silica compatibility and optimized blending property by polymerizing a styrene-butadiene copolymer using an epoxy acrylate monomer having an epoxy group and then ring-opening the epoxy group.

Accordingly, an object of the present invention is to provide a functional styrene-butadiene copolymer represented by Chemical Formula 2 which is obtained by ring-opening polymerization of a styrene monomer, a butadiene monomer and an epoxy acrylate monomer represented by Chemical Formula 1.

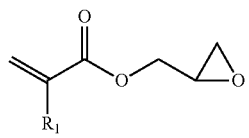

(1)

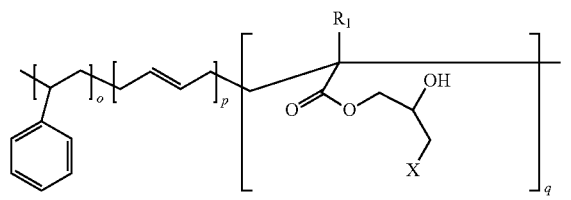

(2)

In Chemical Formulas 1 and 2, $R_1$ represents hydrogen or methyl, $0.1 \leq o \leq 0.5$, $0.45 \leq p \leq 0.85$, $0.01 \leq q \leq 0.10$, $o+p+q=1$, and X represents a functional group which can participate in epoxy ring-opening, preferably hydroxyl.

Another object of the present invention is to provide a silica composite obtained by blending the styrene-butadiene copolymer with silica.

To achieve the object of the present invention, the present invention provides a functional styrene-butadiene copolymer represented by Chemical Formula 2 which is obtained by ring-opening polymerization of a styrene monomer, a butadiene monomer and an epoxy acrylate monomer represented by Chemical Formula 1.

Further, the present invention provides a method for preparing the functional styrene-butadiene copolymer represented by Chemical Formula 2 by radical polymerization of a styrene monomer, a butadiene monomer and an epoxy acrylate monomer in an emulsion state to prepare a copolymer and performing ring-opening under an acidic or alkaline condition. As a result of the ring-opening of the epoxy ring, the copolymer represented by Chemical Formula 2 has optimized polarity adequate for blend compounding with silica.

The styrene-butadiene copolymer of the present invention which is produced by introducing a novel epoxy acrylate monomer and performing ring-opening has optimized silica compatibility, superior tensile strength and excellent dynamic property. Therefore, when used as a tire tread material, the copolymer may reduce hysteresis, improve wet stopping performance of the tire, and enhance wear resistance.

BRIEF DESCRIPTION OF THE DRAWINGS

The above and other aspects, features and advantages of the disclosed exemplary embodiments will be more apparent from the following detailed description taken in conjunction with the accompanying drawings in which.

DESCRIPTION OF SPECIFIC EMBODIMENTS

Figure 1:
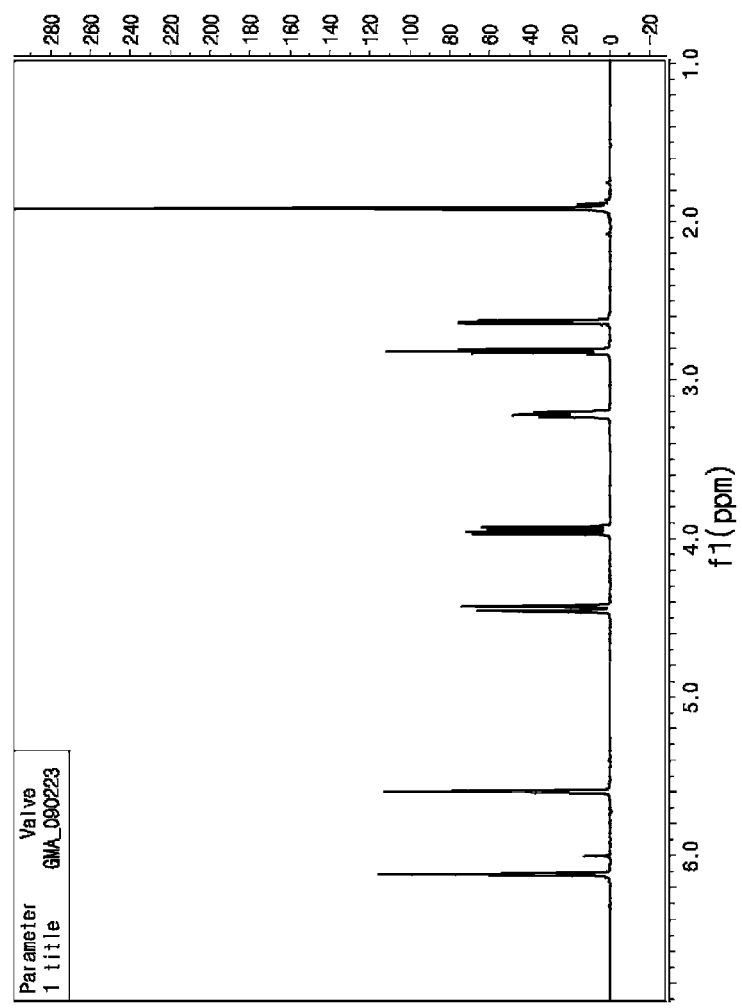
FIG. 1 shows NMR data of glycidyl methyl methacrylate.

The advantages, features and aspects of the invention will become apparent from the following description of the embodiments with reference to the accompanying drawings, which is set forth hereinafter.

The present invention provides a functional styrene-butadiene copolymer prepared by radical polymerization of a styrene monomer, a butadiene monomer and an epoxy acrylate monomer in emulsion state to prepare a copolymer and ring-opening the styrene-butadiene-epoxy acrylate copolymer, and a composite material using the same. With optimized polarity, the resultant copolymer has excellent wet stopping performance and superior wear resistance when blended with silica. Therefore, it may be usefully applied for industrial materials including fuel-efficient tires, snow tires, belts, hoses, etc.

The components of the functional styrene-butadiene copolymer of the present invention will be described in detail.

Among the monomers used in the polymerization reaction, the styrene monomer may be one or more selected from styrene, monochlorostyrene, methylstyrene and dimethylstyrene, and is preferably used in an amount of 10 to 50 wt % based on the weight of the total monomers. If it is used in an amount less than 10 wt %, tensile property and other mechanical properties may be degraded. Meanwhile, if it is used in an amount exceeding 50 wt %, elasticity and wear resistance may be degraded.

The butadiene monomer may be one or more selected from 1,3-butadiene, chlorobutadiene and isoprene, and is preferably used in an amount of 45 to 85 wt % based on the weight of the total monomers. If it is used in an amount less than 45 wt %, elasticity and wear resistance may be degraded. Meanwhile, if it is used in an amount exceeding 85 wt %, tensile property and other mechanical properties may be degraded.

In a copolymer produced from the styrene monomer and the butadiene monomer, the butadiene unit may have trans or cis configuration.

The epoxy acrylate monomer may be glycidyl acrylate, glycidyl methacrylate, or the like, and is preferably used in an amount of 0.1 to 10 wt % based on the weight of the total monomers. If it is used in an amount less than 0.1 wt %, the styrene-butadiene-acrylate copolymer may have insufficient hydrophilicity. Meanwhile, if it is used in an amount exceeding 10 wt %, processing may be difficult because of reduced elasticity and increased strength.

In the present invention, a radical initiator commonly used in the art may be used. Preferably, one or more initiator system generally used in emulsion polymerization selected from persulfates such as potassium persulfate and ammonium persulfate, acetylacetone peroxide, benzyl peroxide, dicumyl peroxide, p-menthane hydroperoxide, 2,4-dichlorobenzyl peroxide, t-butyl peracetate, 2,2'-azobis(isobutylamidine)dihydrochloride, azobisisobutyronitrile, hydrogen peroxide, redox systems, ferrous sulfate, etc. may be used. In the preparation of the copolymer according to the present invention, the radical initiator is preferably used in an amount of 0.05 to 3 parts by weight based on 100 parts by weight of the total monomers. If it is used in an amount less than 0.05 parts by weight, polymerization may not occur sufficiently. Meanwhile, if it is used in an amount exceeding 3 parts by weight, a low-molecular-weight copolymer may be obtained.

Further, in the present invention, an anionic, cationic or non-ionic surfactant may be used as an emulsifier. Preferably, one or more selected from a metal salt and an ammonium salt may be used. More preferably, one or more selected from an alkyl sulfate metal salt, an alkyl allyl sulfonic acid metal salt, an alkyl phosphate metal salt, an alkyl sulfate ammonium salt, an alkyl allyl sulfonic acid ammonium salt, an alkyl aryl sulfonic acid ammonium salt, an allyl sulfonic acid ammonium salt and an alkyl phosphate ammonium salt may be used. Particularly preferably, one or more metal salt or ammonium salt selected from dodecylbenzenesulfonic acid, rosin acids, fatty acids, lauryl sulfonic acid and hexadecylsulfonic acid may be used. Here, each of the alkyl, allyl and aryl has 5 to 20 carbon atoms. If the number of the carbon atoms is smaller than 5, the role as an emulsifier may be insufficient. And, if it exceeds 20, hydrophilicity may be degraded. Also, preferably, the emulsifier is used in an amount of 0.1 to 10 parts by weight based on 100 parts by weight of the total monomers. If it is used in an amount less than 0.1 part by weight, micelles may not be formed. Meanwhile, if it is used in an amount exceeding 10 parts by weight, a low-molecular-weight copolymer may be obtained due to the formation of microemulsion.

Further, in the preparation of the styrene-butadiene copolymer, a mercaptan compound having 8 to 20 carbon atoms may be used as a molecular weight modifier. Preferably, one or more selected from octylmercaptan, decylmercaptan, dodecylmercaptan and hexadecylmercaptan may be used. The average molecular weight of the styrene-butadiene copolymer may be controlled by controlling the amount of the molecular weight modifier. When the mercaptan-based molecular weight modifier is used in an amount of 0.001 to 2 parts by weight based on 100 parts by weight of the total monomers, a high-molecular-weight styrene-butadiene copolymer may be prepared. Meanwhile, if it is used in an amount of 0.5 to 2 parts by weight, a low-molecular-weight styrene-butadiene copolymer may be prepared. If the mercaptan-based molecular weight modifier is used in an amount less than 0.0001 part by weight, gelation may occur. Meanwhile, if it is used in an amount exceeding 2 parts by weight, physical properties may be degraded.

Preferably, in the preparation of the styrene-butadiene copolymer, a diethylhydroxylamine, N-isopropylhydroxylamine, monoethylhydroxylamine, sodium dimethyldithiocarbamate, or the like may be used as a polymerization terminator. Preferably, the polymerization terminator may be used in an amount of 0.01 to 2 parts by weight based on 100 parts by weight of the total monomers. If it is used in an amount less than 0.01 part by weight, a problem may occur with regard to reaction termination or gelation. Meanwhile, if it is used in an amount exceeding 2 parts by weight, residual reaction terminator may cause negative effects on manufacturing facilities.

The method for preparing the copolymer of the present invention will be described.

First, a styrene monomer, a butadiene monomer and an epoxy acrylate monomer represented by Chemical Formula 1 are radical polymerized at 0 to 70° C. for 4 to 48 hours in an emulsion state. As a result, a styrene-butadiene copolymer having an average molecular weight of 100,000 to 2,000,000 g/mol is prepared. As described above, the molecular weight of the styrene-butadiene copolymer may be controlled by controlling the amount of the molecular weight modifier to obtain a high-molecular-weight or low-molecular-weight styrene-butadiene copolymer. A high-molecular-weight styrene-butadiene copolymer may be prepared if good elasticity and mechanical properties are desired. And, a low-molecular-weight styrene-butadiene copolymer may be prepared if improved processability is desired. If the temperature is below 0° C. during the copolymer preparation, the emulsion polymerization may not be sufficiently activated. And, if the temperature exceeds 70° C., physical properties of the copolymer may not be maintained.

Then, ring-opening is performed under an acidic or basic condition.

The epoxy group undergoes ring-opening in the presence of an acid, a base or a nucleophile such as amine, thereby improving compatibility with silica. In addition, unreacted monomers may be easily removed through the ring-opening. The degree of the ring-opening may be controlled through acidity. During blending, a styrene-butadiene-epoxy acrylate copolymer which is not ring-opened is capable of chemical bonding.

Preferably, the acid may be sulfuric acid, phosphoric acid, hydrochloric acid, acetic acid, hydrofluoric acid, or the like, and the base may be NaOH, KOH, $NH_4OH$, or the like.

Preferably, the acid or base, i.e. the ring-opening agent, is used in an amount of 1 to 20 parts by weight based on 100 parts by weight of the total monomers. If it is used in an amount less than 1 part by weight, the ring-opening may be too slow. Meanwhile, if it is used in an amount exceeding 20 parts by weight, control of acidity may be difficult.

Thus prepared functional styrene-butadiene copolymer represented by Chemical Formula 2 has a nanosize of 20 to 200 nm. If the copolymer is smaller than 20 nm in size, molecular weight may decrease due to the formation of microemulsion. And, if it is larger than 200 nm in size, gelation and coalescence may occur.

And, the prepared styrene-butadiene copolymer has an average molecular weight of 100,000 to 3,000,000 g/mol. If the average molecular weight is below 100,000 g/mol, physical properties may be degraded. And, if it exceeds 3,000,000 g/mol, processing may be difficult because of gelation and increased hardness.

In addition, a composite prepared by blending the styrene-butadiene copolymer with silica has superior tensile property, wear resistance and wet stopping performance (tan δ at 0° C.). Therefore, it is suitable to be used for industrial materials for tires, snow tires, belts, hoses, etc.

EXAMPLES

The examples will now be described. The following examples are for illustrative purposes only and not intended to limit the scope of this disclosure.

Example 1

Figure 3:
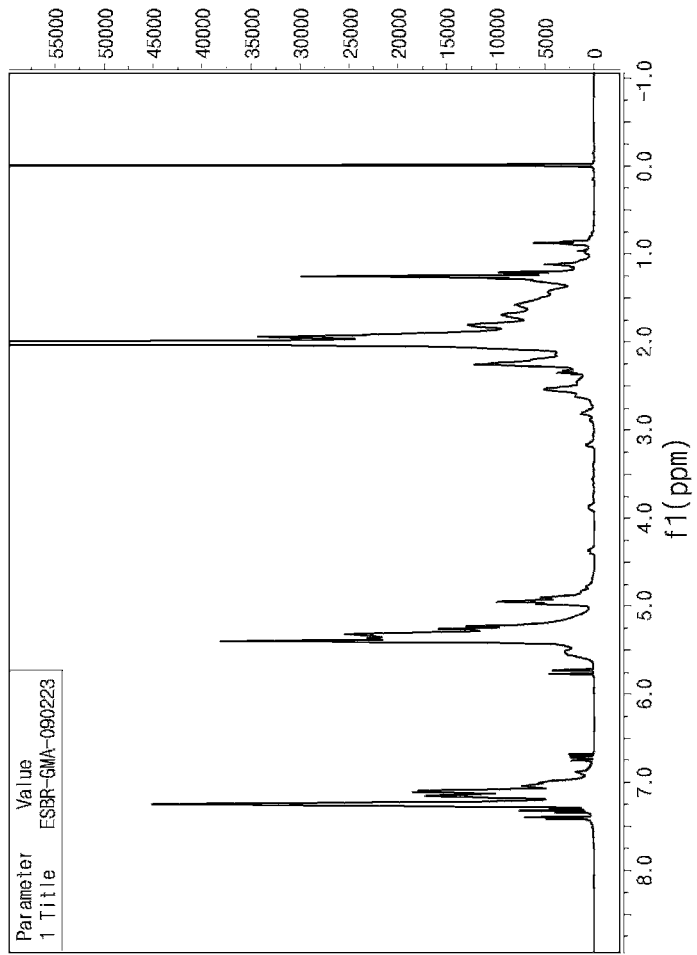
FIG. 3 shows NMR data of a styrene-butadiene-glycidyl methacrylate copolymer prepared in Example 1 (before ring-opening)
Figure 4:
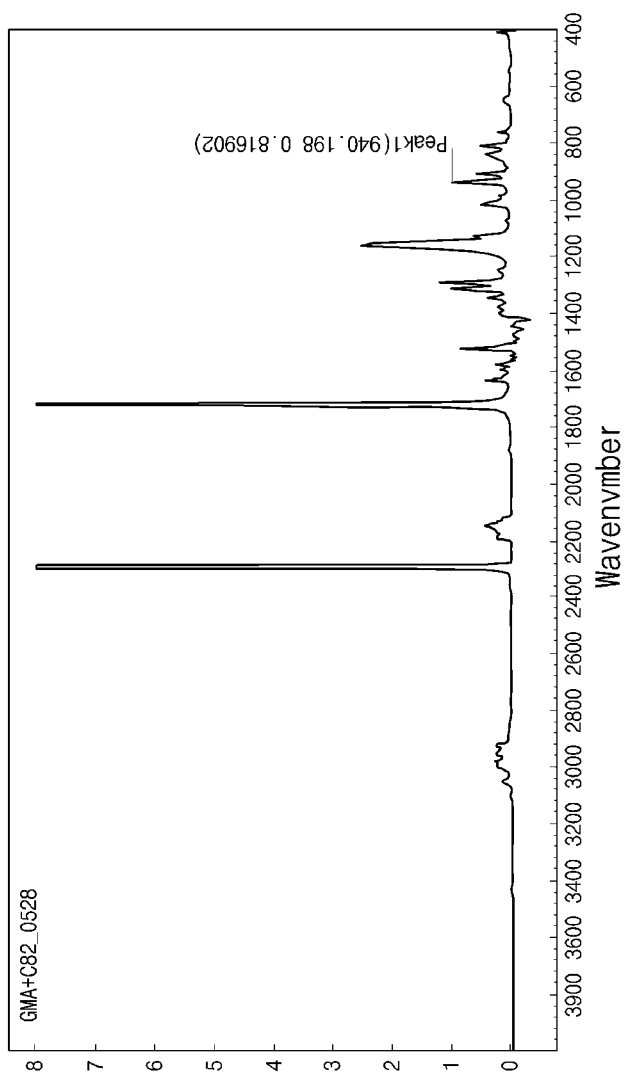
FIG. 4 shows IR data of a styrene-butadiene-glycidyl methacrylate copolymer prepared in Example 1 (before ring-opening)

Water (1,500 mL), sodium rosinate (25 g), sodium salt of fatty acid (35 g), styrene (380 g), glycidyl methyl methacrylate (50 g), 1,3-butadiene (570 g), EDTA (0.6 g), ferrous sulfate (0.1 g), n-dodecylmercaptan (1.5 g) and p-menthane hydroperoxide (0.6 g) were continuously added to a 5 L pressurized reactor at 10° C. and stirred for 24 hours. Then, diethylhydroxylamine (1.0 g) was added to terminate the reaction (see FIG. 3 and FIG. 4).

Figure 5:
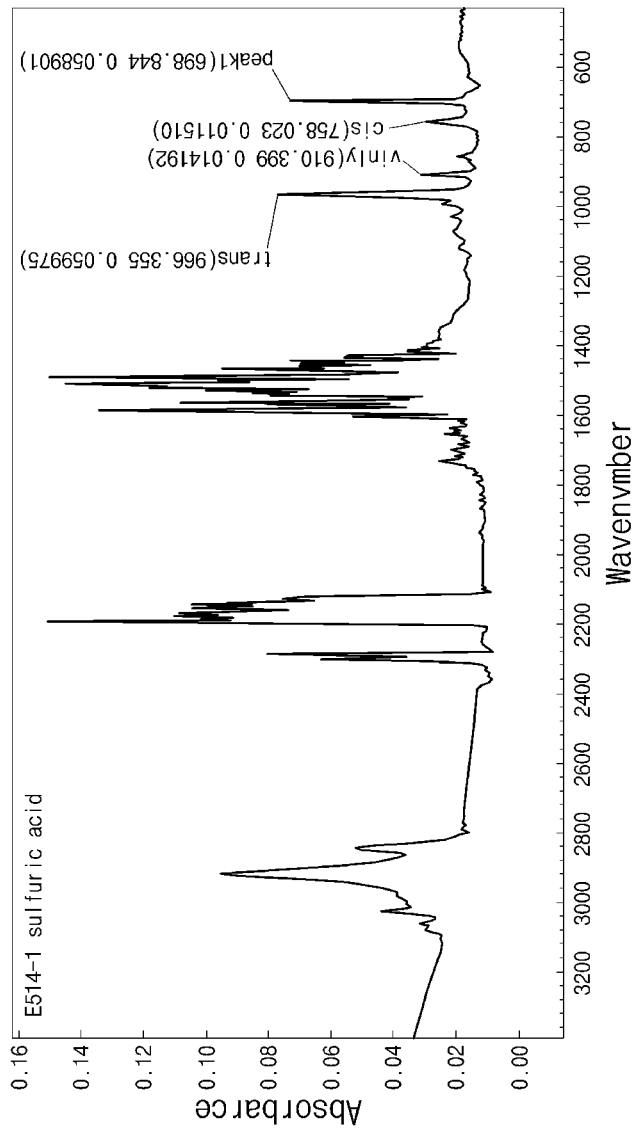
FIG. 5 shows IR data of a styrene-butadiene-dihydroxypropyl methacrylate copolymer prepared in Example 1 (after ring-opening)
Figure 6:
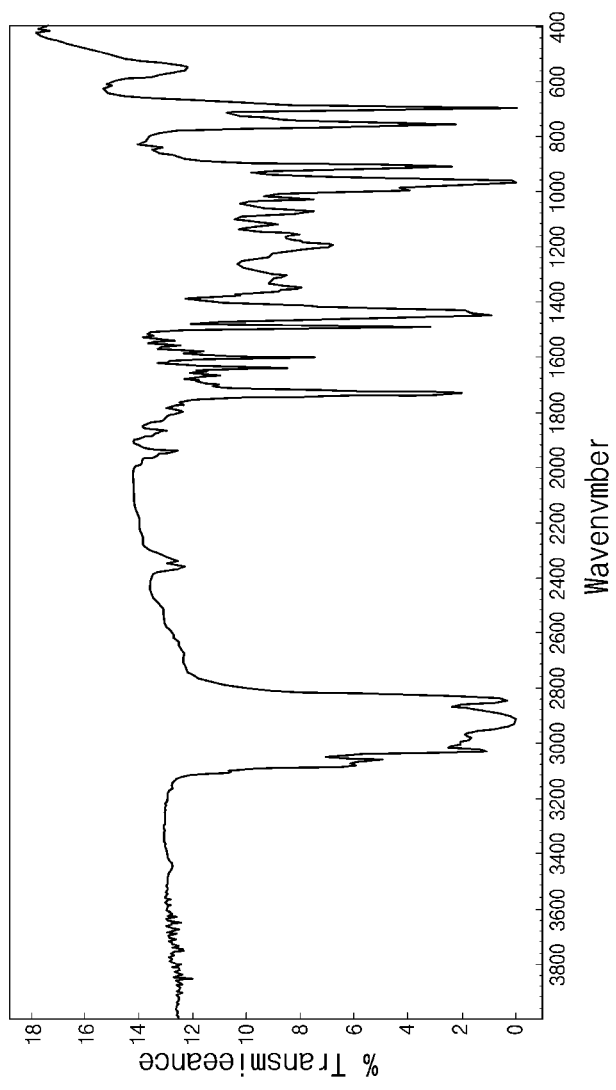
FIG. 6 shows IR data of a styrene-butadiene-dihydroxypropyl methacrylate copolymer prepared in Example 2.
Figure 7:
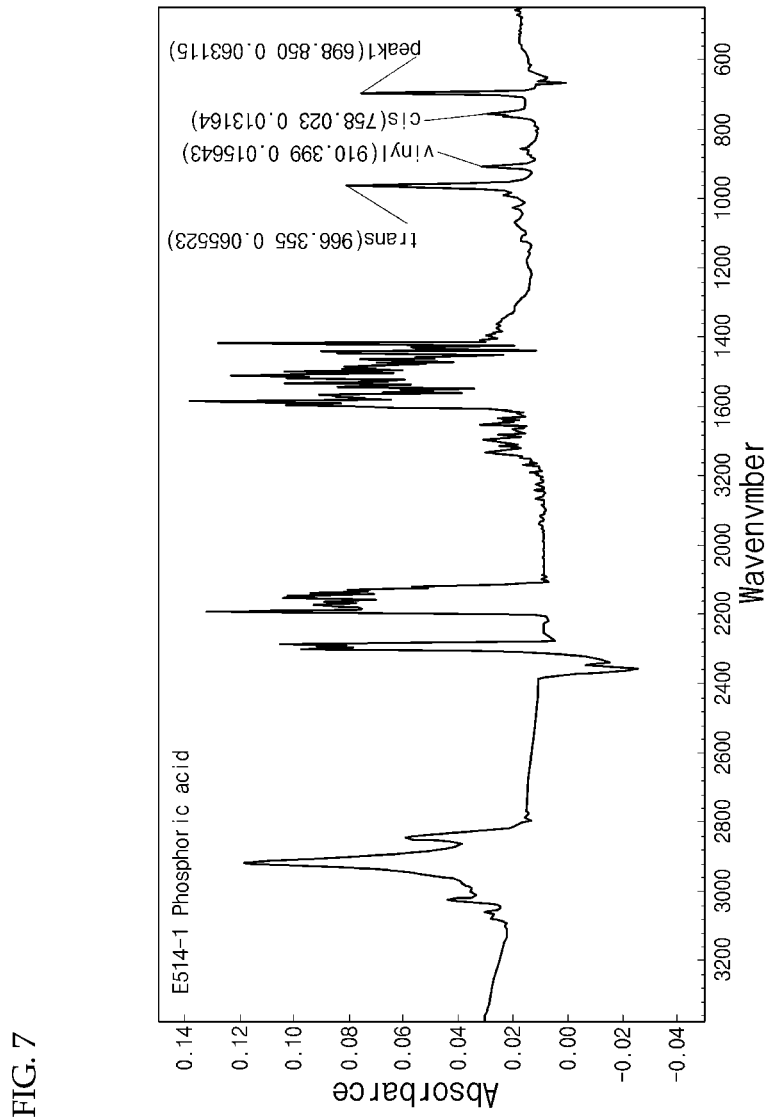
FIG. 7 shows IR data of a styrene-butadiene-dihydroxypropyl methacrylate copolymer prepared in Example 3.

Sulfuric acid (20% aqueous solution, 100 g) was added as a ring-opening agent for ring-opening reaction. Following stripping and drying, a styrene-butadiene-dihydroxypropyl methacrylate copolymer having an average molecular weight of 908,000 g/mol (Chemical Formula 2a) was prepared (see FIG. 5).

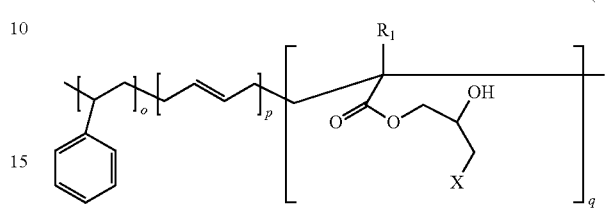

(2a)

In Chemical Formula 2a, $R_1$ represents methyl, o=0.38, p=0.57, q=0.05, o+p+q=1, and X represents hydroxyl.

Example 4

Figure 8:
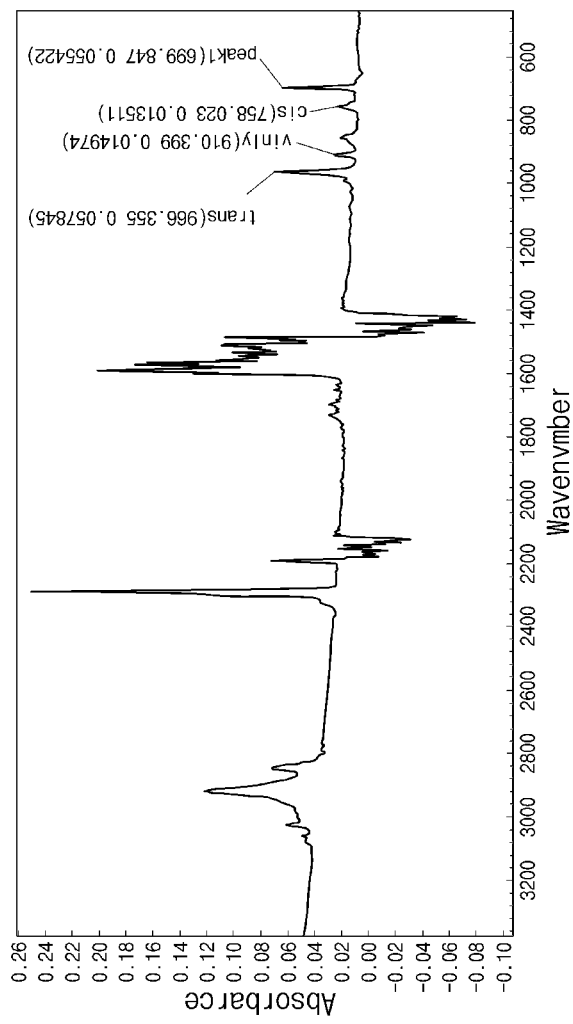
FIG. 8 shows IR data of a styrene-butadiene-dihydroxypropyl methacrylate copolymer prepared in Example 4.

A styrene-butadiene-dihydroxypropyl methacrylate copolymer having an average molecular weight of 740,000 g/mol (Chemical Formula 2d) was prepared in the same manner as Example 1 except for adding NaOH (20% aqueous solution, 100 g) as a ring-opening agent (see FIG. 8).

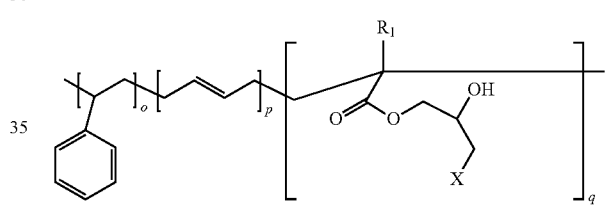

(2d)

In Chemical Formula 2d, $R_1$ represents methyl, o=0.38, p=0.57, q=0.05, o+p+q=1, and X represents hydroxyl.

Example 5

Figure 9:
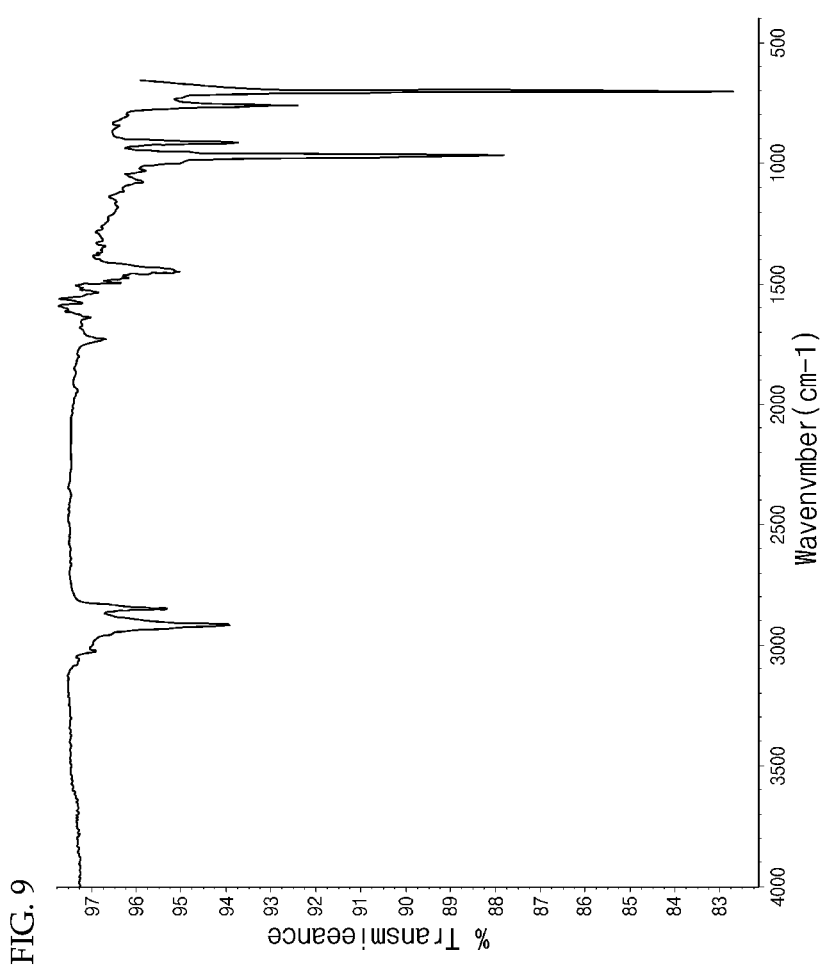
FIG. 9 shows IR data of a styrene-butadiene-dihydroxypropyl methacrylate copolymer prepared in Example 5.

A styrene-butadiene-dihydroxypropyl methacrylate copolymer having an average molecular weight of 791,000 g/mol (Chemical Formula 2e) was prepared in the same manner as Example 1 except for adding KOH (20% aqueous solution, 100 g) as a ring-opening agent (see FIG. 9).

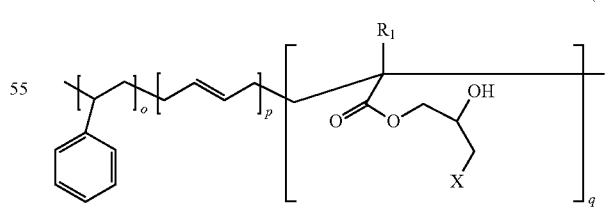

(2e)

In Chemical Formula 2e, $R_1$ represents methyl, o=0.38, p=0.57, q=0.05, o+p+q=1, and X represents hydroxyl.

Comparative Example 1

Water (1,500 mL), sodium rosinate (25 g), sodium salt of fatty acid (35 g), styrene (400 g), 1,3-butadiene (600 g), EDTA (0.6 g), ferrous sulfate (0.1 g), n-dodecylmercaptan (1.5 g) and p-menthane hydroperoxide (0.6 g) were continuously added to a 5 L pressurized reactor at 10° C. and stirred for 24 hours. Then, diethylhydroxylamine (1.0 g) was added to terminate the reaction.

Figure 2:
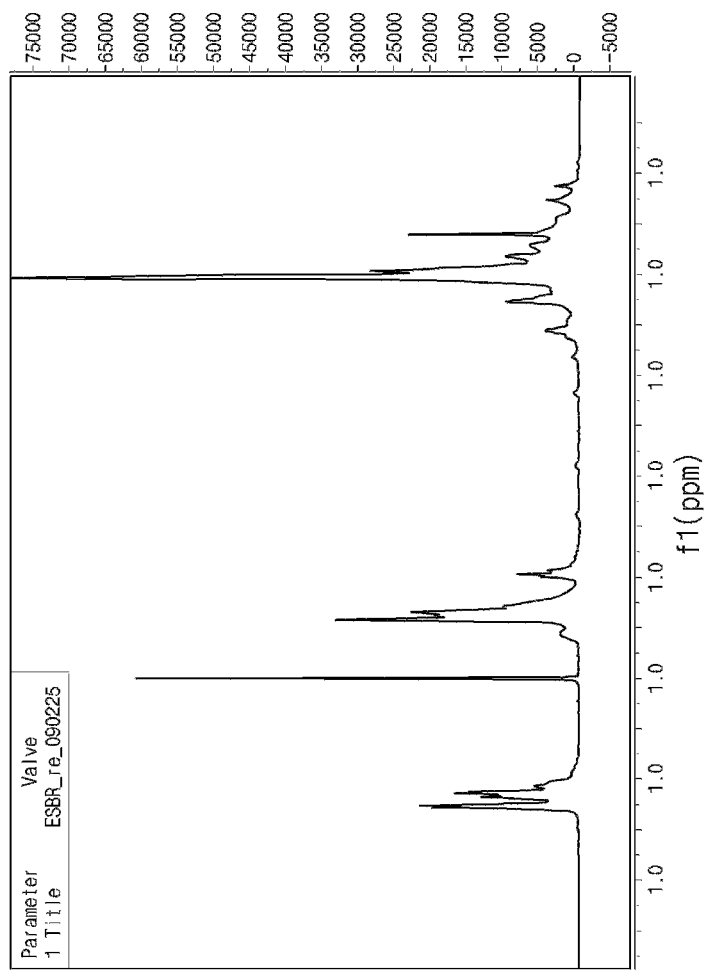
FIG. 2 shows NMR data of a styrene-butadiene copolymer prepared in Comparative Example 1.

A styrene-butadiene copolymer having an average molecular weight of 843,000 g/mol was prepared (see FIG. 2).

Comparative Example 2

Water (1,500 mL), sodium rosinate (25 g), sodium salt of fatty acid (35 g), styrene (380 g), 1,3-butadiene (570 g), methyl methacrylic acid (50 g), EDTA (0.6 g), ferrous sulfate (0.1 g), n-dodecylmercaptan (1.5 g) and p-menthane hydroperoxide (0.6 g) were continuously added to a 5 L pressurized reactor at 10° C. and stirred for 24 hours. Then, diethylhydroxylamine (1.0 g) was added to terminate the reaction.

A styrene-butadiene-methyl methacrylic acid copolymer having an average molecular weight of 795,000 g/mol was prepared (see FIG. 2).

TABLE 1

| | | | Ex. 1 | Ex. 4 | Ex. 5 |
|---|---|---|---|---|---|
| Monomer | Styrene monomer | Styrene | | 380 g | |
| | Butadiene monomer | 1,3-Butadiene | | 570 g | |
| | Acrylate monomer | GMA | | 50 g | |
| | | Total | | 1,000 g | |
| Molecular weight modifier | | n-Dodecylmercaptan | | 1.5 g | |
| Emulsifier | | Sodium rosinate | | 25 g | |
| | | Sodium salt of fatty acid | | 35 g | |
| Radical initiator | | p-menthane hydroperoxide | | 0.6 g | |
| | | EDTA/ferrous sulfate | | 0.6 g/0.1 g | |
| Polymerization terminator | | Diethylhydroxylamine | | 1.0 g | |
| Ring-opening agent | | Sulfuric acid (20% aq. soln.) | 100 g | — | — |
| | | Phosphoric acid (30% aq. soln.) | — | — | — |
| | | Phosphoric acid (30% aq. soln.) | — | — | — |
| | | NaOH (20% aq. soln.) | — | 100 g | — |
| | | KOH (20% aq. soln.) | — | — | 100 g |

GMA: glycidyl methyl methacrylate

TABLE 2

| | | | Comp. Ex. 1 | Comp. Ex. 2 |
|---|---|---|---|---|
| Monomer | Styrene monomer | Styrene | 400 g | 380 g |
| | Butadiene monomer | 1,3-Butadiene | 600 g | 570 g |
| | Acrylate monomer | Methyl methacrylic acid | — | 50 g |
| Molecular weight modifier | | n-Dodecylmercaptan | | 1.5 g |
| Emulsifier | | Sodium rosinate | | 25 g |
| | | Sodium salt of fatty acid | | 35 g |
| Radical initiator | | p-menthane hydroperoxide | | 0.6 g |
| | | EDTA/ferrous sulfate | | 0.6 g/0.1 g |
| Polymerization terminator | | Diethylhydroxylamine | | 1.0 g |

Preparation Example 1

Preparation of Tire Tread Sheet

The styrene-butadiene-dihydroxypropyl methacrylate copolymer prepared in Example 1 (100 g), process oil (37.5 g), zinc oxide (3 g), stearic acid (2 g), silica (Zeosil 175, 75 g), bis(3-triethoxysilylpropyl)disulfide (Si69, 6 g) and antioxidant (6-PPD; N-(1,3-dimethyl)-N'-phenyl-p-phenylenediamine, 2 g) were sequentially added to a sealed mixer (Banbury mixer). After mixing for 6 minutes and 30 seconds under a condition of 120° C. and 60 rpm, followed by lowering temperature to 60° C. and adding sulfur (2 g) and vulcanization accelerator (N-cyclohexyl-2-benzothiazylsulfenamide, 3 g), the mixture was further mixed for 3 minutes under a condition of 60° C. and 50 rpm. Then, after processing into a flat sheet using a 2 mm-thick roll, the sheet was allowed to stand for 24 hours. After vulcanization by applying a pressure of 160 kgf/cm$^2$ or above for 10 minutes on a hot press of 160° C., 2 mm-thick sheet sample for physical property measurement was prepared.

Preparation Example 3

Preparation of Tire Tread Sheet

The styrene-butadiene-dihydroxypropyl methacrylate copolymer prepared in Example 4 (65 g), polybutadiene (35 g), zinc oxide (3 g), stearic acid (2 g), silica (41 g), carbon black (N-330, 43 g), bis(3-triethoxysilylpropyl)disulfide (4 g) and antioxidant (6-PPD, 2 g) were sequentially added to a sealed mixer (Banbury mixer). After mixing for 6 minutes and 30 seconds under a condition of 120° C. and 60 rpm, followed by lowering temperature to 60° C. and adding sulfur (2 g) and vulcanization accelerator (N-cyclohexyl-2-benzothiazyl-sulfenamide, 3 g), the mixture was further mixed for 3 minutes under a condition of 60° C. and 50 rpm. Then, after processing into a flat sheet using a 2 mm-thick roll, the sheet was allowed to stand for 24 hours. After vulcanization by applying a pressure of 160 kgf/cm² or above for 10 minutes on a hot press of 160° C., 2 mm-thick sheet sample for physical property measurement was prepared.

Preparation Example 4

Preparation of Tire Tread Sheet

The styrene-butadiene-dihydroxypropyl methacrylate copolymer prepared in Example 5 (35 g), polybutadiene (25 g), zinc oxide (3 g), stearic acid (2 g), silica (65 g), bis(3-triethoxysilylpropyl)disulfide (5 g) and antioxidant (6-PPD, 2 g) were sequentially added to a sealed mixer (Banbury mixer). After mixing for 6 minutes and 30 seconds under a condition of 120° C. and 60 rpm, followed by lowering temperature to 60° C. and adding sulfur (2 g) and vulcanization accelerator (N-cyclohexyl-2-benzothiazylsulfenamide, 3 g), the mixture was further mixed for 3 minutes under a condition of 60° C. and 50 rpm. Then, after processing into a flat sheet using a 2 mm-thick roll, the sheet was allowed to stand for 24 hours. After vulcanization by applying a pressure of 160 kgf/cm² or above for 10 minutes on a hot press of 160° C., 2 mm-thick sheet sample for physical property measurement was prepared.

Comparative Preparation Example 2

Preparation of Tire Tread Sheet

The styrene-butadiene copolymer prepared in Comparative Example 1 (100 g), process oil (37.5 g), zinc oxide (3 g), stearic acid (2 g), silica (Zeosil 175, 75 g), bis(3-triethoxysilylpropyl)disulfide (6 g) and antioxidant (6-PPD, 2 g) were sequentially added to a sealed mixer (Banbury mixer). After mixing for 6 minutes and 30 seconds under a condition of 120° C. and 60 rpm, followed by lowering the temperature to 60° C. and adding sulfur (2 g) and vulcanization accelerator (N-cyclohexyl-2-benzothiazylsulfenamide, 3 g), the mixture was further mixed for 3 minutes under a condition of 60° C. and 50 rpm. Then, after processing into a flat sheet using a 2 mm-thick roll, the sheet was allowed to stand for 24 hours. After vulcanization by applying a pressure of 160 kgf/cm² or above for 10 minutes on a hot press of 160° C., 2 mm-thick sheet sample for physical property measurement was prepared.

Comparative Preparation Example 3

Preparation of Tire Tread Sheet

The styrene-butadiene copolymer prepared in Comparative Example 1 (100 g), process oil (37.5 g), zinc oxide (3 g), stearic acid (2 g), carbon black (N-330, 75 g), bis(3-triethoxysilylpropyl)disulfide (6 g) and antioxidant (6-PPD, 2 g) were sequentially added to a sealed mixer (Banbury mixer). After mixing for 6 minutes and 30 seconds under a condition of 120° C. and 60 rpm, followed by lowering temperature to 60° C. and adding sulfur (2 g) and vulcanization accelerator (N-cyclohexyl-2-benzothiazylsulfenamide, 3 g), the mixture was further mixed for 3 minutes under a condition of 60° C. and 50 rpm. Then, after processing into a flat sheet using a 2 mm-thick roll, the sheet was allowed to stand for 24 hours. After vulcanization by applying a pressure of 160 kgf/cm² or above for 10 minutes on a hot press of 160° C., 2 mm-thick sheet sample for physical property measurement was prepared.

Comparative Preparation Example 4

Preparation of Tire Tread Sheet

The styrene-butadiene copolymer prepared in Comparative Example 1 (65 g), polybutadiene (35 g), zinc oxide (3 g), stearic acid (2 g), silica (Zeosil 175, 45 g), carbon black (N-330, 46.5 g), bis(3-triethoxysilylpropyl)disulfide (4 g) and antioxidant (6-PPD, 2 g) were sequentially added to a sealed mixer (Banbury mixer). After mixing for 6 minutes and 30 seconds under a condition of 120° C. and 60 rpm, followed by lowering temperature to 60° C. and adding sulfur (2 g) and vulcanization accelerator (N-cyclohexyl-2-benzothiazylsulfenamide, 3 g), the mixture was further mixed for 3 minutes under a condition of 60° C. and 50 rpm. Then, after processing into a flat sheet using a 2 mm-thick roll, the sheet was allowed to stand for 24 hours. After vulcanization by applying a pressure of 160 kgf/cm² or above for 10 minutes on a hot press of 160° C., 2 mm-thick sheet sample for physical property measurement was prepared.

Comparative Preparation Example 5

Preparation of Tire Tread Sheet

The styrene-butadiene copolymer prepared in Comparative Example 1 (75 g), polybutadiene (25 g), zinc oxide (3 g), stearic acid (2 g), silica (Zeosil 175, 65 g), bis(3-triethoxysilylpropyl)disulfide (4 g) and antioxidant (6-PPD, 2 g) were sequentially added to a sealed mixer (Banbury mixer). After mixing for 6 minutes and 30 seconds under a condition of 120° C. and 60 rpm, followed by lowering temperature to 60° C. and adding sulfur (2 g) and vulcanization accelerator (N-cyclohexyl-2-benzothiazylsulfenamide, 3 g), the mixture was further mixed for 3 minutes under a condition of 60° C. and 50 rpm. Then, after processing into a flat sheet using a 2 mm-thick roll, the sheet was allowed to stand for 24 hours. After vulcanization by applying a pressure of 160 kgf/cm² or above for 10 minutes on a hot press of 160° C., 2 mm-thick sheet sample for physical property measurement was prepared.

Test Example

Measurement of Physical Properties

Physical properties of the samples prepared in Preparation Examples 1 to 4 and Comparative Preparation Examples 1 to 5 were measured. The result is given in Tables 3 to 6.

Processability was evaluated by Mooney viscosity. Tensile strength was measured according to ASTM D412. Wear resistance was measured by the DIN method. Wet stopping performance was evaluated by the hysteresis (tan δ) method.

TABLE 3

| | | Prep. Ex. 1 Silica-based |
|---|---|---|
| Composition (g) | GMA-SBR | 100 |
| | ESBR | — |
| | Silica | 75 |
| | Oil | 37.5 |
| | Si69 | 6 |
| | Carbon black | — |
| | ZnO | 3 |
| | S/A | 2 |
| | Sulfur | 2 |
| | Vulcanization accelerator | 3 |
| | 6-PPD | 2 |

TABLE 3-continued

|  |  | Prep. Ex. 1 Silica-based |
|---|---|---|
| Processability | Mooney viscosity ($ML_{1+4}$, 100° C.) | 73 |
| Tensile property | Hardness (Shore A) | 68 |
|  | Modulus 100% (kgf/cm$^2$) | 31.2 |
|  | Tensile strength (kgf/cm$^2$) | 254 |
|  | Elongation (%) | 355 |
| Dynamic property | $T_g$ (° C.) | −9.5 |
|  | tan δ (0° C.) | 0.925 |
|  | tan δ (70° C.) | 0.078 |
| Wear resistance (DIN) | Wear loss (g) | 0.075 |

GMA-SBR: styrene-butadiene-dihydroxypropyl methacrylate copolymer
ESBR: styrene-butadiene copolymer (molecular weight 982,000), Kumho 1739
Si69: bis(3-triethoxysilylpropyl) disulfide
S/A: stearic acid
6-PPD: N-(1,3-dimethyl)-N'-phenyl-p-phenylenediamine
Vulcanization accelerator: N-cyclohexyl-2-benzothiazylsulfenamide As seen in Table 3, the copolymer of the present invention exhibits optimized silica compatibility as well as superior tensile strength, wet stopping performance and wear resistance.

TABLE 4

|  |  | Prep. Ex. 3 | Prep. Ex. 4 |
|---|---|---|---|
| Composition (g) | GMA-SBR | 65 | 35 |
|  | ESBR | — | 40 |
|  | Polybutadiene | 35 | 25 |
|  | Silica | 41 | 65 |
|  | Si69 | 4 | 5 |
|  | Carbon black | 43 | — |
|  | Sulfur | 2 | 2 |
|  | Vulcanization accelerator | 3 | 3 |
|  | 6-PPD | 2 | 2 |
| Processability | Mooney viscosity ($ML_{1+4}$, 100° C.) | 73 | 68 |
| Tensile property | Hardness (Shore A) | 71 | 65 |
|  | Modulus 100% (kgf/cm$^2$) | 49.8 | 43.4 |
|  | Tensile strength (kgf/cm$^2$) | 269.5 | 264.8 |
|  | Elongation (%) | 381.6 | 344.1 |
| Dynamic property | $T_g$ (° C.) | −11.4 | −9.2 |
|  | tan δ (0° C.) | 0.858 | 0.851 |
|  | tan δ (70° C.) | 0.086 | 0.0786 |
| Wear resistance (DIN) | Wear loss (g) | 0.087 | 0.068 |

Polybutadiene: molecular weight 600,000, Kumho KBR-01

TABLE 5

|  |  | Comp. Prep. Ex. 2 Silica-based | Comp. Prep. Ex. 3 C/B-based |
|---|---|---|---|
| Composition (g) | GMA-SBR | — | — |
|  | ESBR | 100 | 100 |
|  | Silica | 75 | — |
|  | Oil | 37.5 | 37.5 |
|  | Si69 | 6 | 6 |
|  | Carbon black | — | 75 |
|  | ZnO | 3 | 3 |
|  | S/A | 2 | 2 |
|  | Sulfur | 2 | 2 |
|  | Vulcanization accelerator | 3 | 3 |
|  | 6-PPD | 2 | 2 |
| Processability | Mooney viscosity ($ML_{1+4}$, 100° C.) | 79 | 72 |

TABLE 5-continued

|  |  | Comp. Prep. Ex. 2 Silica-based | Comp. Prep. Ex. 3 C/B-based |
|---|---|---|---|
| Tensile property | Hardness (Shore A) | 67 | 65 |
|  | Modulus 100% (kgf/cm$^2$) | 33.1 | 25 |
|  | Tensile strength (kgf/cm$^2$) | 227.6 | 205.9 |
|  | Elongation (%) | 395.5 | 455.6 |
| Dynamic property | $T_g$ (° C.) | −7 | −10.1 |
|  | tan δ (0° C.) | 0.559 | 0.554 |
|  | tan δ (70° C.) | 0.184 | 0.192 |
| Wear resistance (DIN) | Wear loss (g) | 0.125 | 0.134 |

TABLE 6

|  |  | Comp. Prep. Ex. 2 | Comp. Prep. Ex. 3 |
|---|---|---|---|
| Composition (g) | GMA-SBR | — | — |
|  | ESBR | 65 | 75 |
|  | Polybutadiene | 35 | 25 |
|  | Silica | 45 | 65 |
|  | Si69 | 4 | 4 |
|  | Carbon black | 46.5 | — |
|  | ZnO | 3 | 3 |
|  | S/A | 2 | 2 |
|  | Sulfur | 2 | 2 |
|  | Vulcanization accelerator | 3 | 3 |
|  | 6-PPD | 2 | 2 |
| Processability | Mooney viscosity ($ML_{1+4}$, 100° C.) | 73 | 70 |
| Tensile property | Hardness (Shore A) | 71 | 65 |
|  | Modulus 100% (kgf/cm$^2$) | 28.1 | 26.6 |
|  | Tensile strength (kgf/cm$^2$) | 212 | 174.8 |
|  | Elongation (%) | 395.1 | 407.7 |
| Dynamic property | $T_g$ (° C.) | −9.6 | −10.9 |
|  | tan δ (0° C.) | 0.5704 | 0.5517 |
|  | tan δ (70° C.) | 0.1763 | 0.0926 |
| Wear resistance (DIN) | Wear loss (g) | 0.107 | 0.095 |

As seen in Tables 2 to 6, the copolymers of the present invention prepared in Preparation Examples 1 to 4 exhibit superior tensile strength, wear resistance, wet stopping performance (tan δ at 0° C.) and fuel-efficiency (tan δ at 70° C.) when compared with those prepared in Comparative Preparation Example 2 to 5.

While the present invention has been described with respect to the specific embodiments, it will be apparent to those skilled in the art that various changes and modifications may be made without departing from the spirit and scope of the invention as defined in the following claims.

What is claimed is:

1. A functional styrene-butadiene copolymer for a silica composite obtained by blending with silica, represented by Chemical Formula 2:

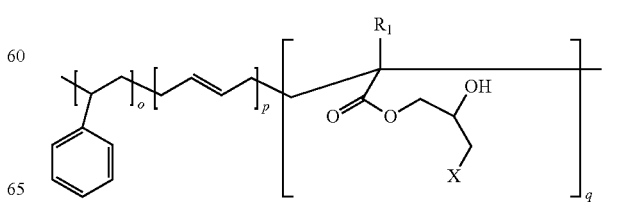

wherein $R_1$ represents hydrogen or methyl, o=0.38, p=0.57 and q=0.05 by weight ratio, o+p+q=1, and X is hydroxyl.

2. A silica composite obtained by blending the styrene-butadiene copolymer according to claim 1 with silica.

3. The composite according to claim 2, which is an industrial material for tires, hoses or belts.

* * * * *